United States Patent

Brennen

[15] 3,673,452
[45] June 27, 1972

[54] SPARK PLUG

[72] Inventor: Ronald F. Brennen, 3921 Crystal Lake Drive, Pompano Beach, Fla. 33064

[22] Filed: Sept. 21, 1970

[21] Appl. No.: 73,735

[52] U.S. Cl............................................313/141, 313/141.1
[51] Int. Cl..........................................................H01t 13/20
[58] Field of Search.................................313/141, 141.1, 311

[56] References Cited

UNITED STATES PATENTS

| | | | |
|---|---|---|---|
| 2,296,033 | 9/1942 | Heller | 313/141 X |
| 2,391,455 | 12/1945 | Hensel | 313/141.1 X |
| 1,445,712 | 2/1923 | Reijnhout | 313/141.1 |

*Primary Examiner*—Nathan Kaufman
*Attorney*—Harry N. Schofer

[57] ABSTRACT

A spark plug for a combustion engine or a combustion chamber, in which the electrodes of ferrous metals or ferroalloys have a coating fused directly thereon by a process known in the art as "electronic sputtering." The coating forms a very thin laminar deposit of a high temperature resistant metal, for example, one of the carbides of tungsten, titanium and chromium.

5 Claims, 2 Drawing Figures

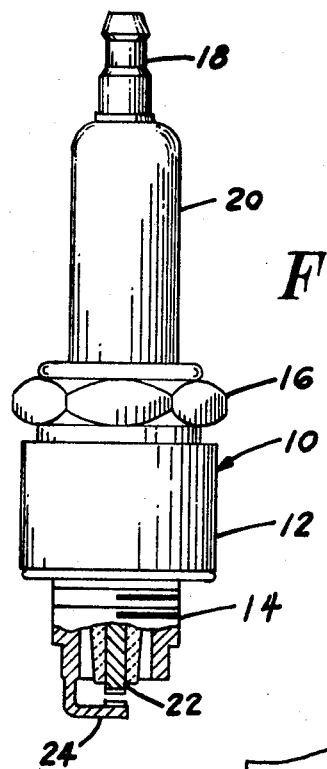
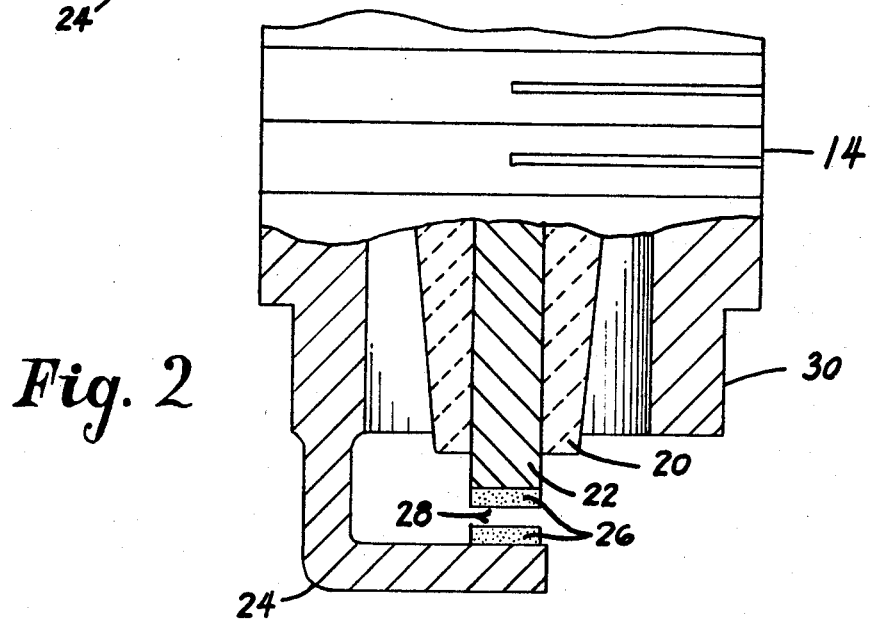
INVENTOR
RONALD F. BRENNEN
ATTORNEY

# SPARK PLUG

BACKGROUND OF THE INVENTION

1. Field of the Invention

This invention relates to spark producing electrodes, and more particularly to the electrodes of ferrous metals or ferroalloys for spark plugs operating in high temperature environments such as, for example, the engine cylinders of internal combustion engines, or for the purpose of igniting combustion chambers.

Spark plugs and the electrodes thereof operating in combustion chambers or engine cylinders where they are subjected to high temperatures are usually made of high temperature steel. Because of the repeated arcing across the electrodes at the existing operating temperatures, severe pitting of the ends of the electrodes soon takes place, requiring frequent replacement of the spark plugs. In an automobile engine, for instance, it is recommended that the spark plugs be replaced every 8,000–10,000 miles, while in airplane engines, where the failure of a spark plug may have more serious consequences, the recommended replacement period is much shorter.

2. Description of the Prior Art

Various attempts have been made to provide coatings of heat resistant metals on the electrodes of spark plugs, but have not been successful as they call for brazing to bond the coating to the metal of the electrodes. Under the high temperature conditions in which the electrodes operate, the bonding material quickly fails, and the coating is lost.

It is an object of this invention to provide a spark plug having a much longer useful life, requiring much less frequent replacement.

It is a further object to provide a novel spark plug in which the electrodes are directly coated by fusing, without the interposition of a bonding agent, with the high temperature resistant metal.

It is a still further object to provide a novel spark plug, the electrodes of which are made of ferrous metals or ferroalloys, said electrodes having directly fused thereon, without the interposition of a bonding agent, by a process known in the art as "electronic sputtering", a molecularly bonded coating of a carbide of one of the metals selected from the group consisting of tungsten, titanium and chromium having a thickness not exceeding 0.002inch.

SUMMARY OF THE INVENTION

The attainment of the above objects, as well as other objects and advantages, is accomplished by depositing and fusing a coating not exceeding 0.002 inch of a high temperature resistant material such as, for example, one of the carbides of tungsten, titanium and chromium, directly to the metal of the electrodes, without the interposition of an intermediate bonding agent. The high temperature resistant material is deposited on the surface of the electrodes by a process known in the art as electronic sputtering. A device for producing such a coating or deposit is disclosed in my copending application, Ser. No. 73,736, filed on Sept. 21, 1970, entitled Anodic Depositor, now abandoned.

BRIEF DESCRIPTION OF THE DRAWING

For a better understanding of the invention, reference is made to the following specification describing a preferred embodiment in detail, and to the annexed drawing, in which:

FIG. 1 is an elevation view, partly in section, of a spark plug showing a coating on the electrodes thereof; and FIG. 2 is an enlarged view, partly in elevation and partly in section, of the lower end of the spark plug of FIG. 1 showing my invention more clearly.

DETAILED DESCRIPTION OF A PREFERRED EMBODIMENT

Referring to the annexed drawing, the numeral 10 designates a spark plug in its entirety, and includes a shank 12 having a threaded portion 14 by which the spark plug may be screwed into a cylinder head by means of a tool cooperating with a hexagonal nut 16. The upper end of the spark plug 10 includes a cap 18 for attachment with a conductor receiving current from a source of high voltage electricity to intermittently create a spark across the gap of the electrodes. The cap 18 is positioned at the upper end of a first electrode 22 which is insulated from the shank 12 by a porcelain insulation 20, the electrode 22 passing through the entire length of the spark plug 10. The lower end of the spark plug is extended to form a skirt 30 carrying a second electrode 24. The skirt 30 and threaded portion 14 provide a conductor with the engine block of the engine (not shown) to ground the electrode 24. The electrodes 22 and 24 are made of ferrous metals or ferroalloys.

On the lower end of the electrode 22, and on the upper surface of the electrode 24 in the area facing the electrode 22, there is deposited a very thin coating 26 of a high temperature resistant material such as, one of the carbides of tungsten, titanium and chromium. The surfaces of the coatings 26 are spaced to form a gap 28 across which a spark is created when a high voltage electrical charge is impressed across the electrodes 22 and 24.

Spark plugs now in use, in which the electrodes are made of high temperature steel, have a relatively short useful life. Because of the high temperature operating conditions under which they operate, and the high voltage arcs across the electrodes, the electrodes soon become badly pitted and are rendered useless. The addition of the coatings 26 of a material that has a high wear resistance under the conditions existing in an engine cylinder or in a combustion chamber will greatly extend the useful life of the spark plugs.

The coatings 26 are deposited directly on the metal of the electrodes without the interposition of any intermediate bonding agent such as brazing and the like. In the practice of my invention, the metal coating is electronically fused into the pores of the electrodes, and will not chip or peel.

The coatings 26 are deposited by a device known in the trade as a "sputterer" or "metal depositor" by a process known as electronic sputtering. An example of the device which may be used is disclosed in my copending application, Ser. No. 73,736, filed on Sept. 21, 1970, now abandoned. In this device, an electrode is vibrated rapidly to and from a work piece to be coated, about 60 times per second, or 3,600 times a minute. The work piece should be an electric conductive material, and the vibrating electrode has a tip made of the metal to be deposited on the surface of the work piece. The work piece and the vibrating tip are electrically connected in a circuit which supplies an electric current to the work piece and vibrating tip synchronously with the vibrations, so that each time the vibrating tip contacts the work piece, a tiny particle of the metal of which the tip is made is deposited and electronically fused into the surface of the work piece. For every 0.0001 inch deposited below the surface of the work piece, an equal amount is deposited above the surface. The tip is moved relative to the surface of the work piece over the required area as many times as necessary to completely cover the area. The maximum thickness that a carbide of a metal can be deposited by this process is 0.002 inch.

As used in the subjoined claims, the term "directly fused" refers to the fusion of a coating directly to the electrodes of the spark plug without the interposition of any bonding agent, either as a separate material or as a material in the alloy of an electrode.

I claim:

1. A spark plug for a combustion engine or combustion chamber having a pair of spaced electrodes exposed to high operating temperatures, said electrodes having thereon a coating of a high temperature resistant material selected from the group consisting of the carbides of tungsten, titanium and chromium.

2. A spark plug for a combustion engine or combustion chamber as defined in claim 1, in which the high temperature resistant material is deposited as a very thin coating only on the portions of the electrodes facing each other.

3. A spark plug for a combustion engine or combustion chamber as defined in claim 4, in which the thickness of the coating is not in excess of 0.002 inch.

4. A spark plug for a combustion engine or combustion chamber as defined in claim 1, in which the coating is deposited by an "electronic sputtering" process.

5. A spark plug for a combustion engine or a combustion chamber as defined in claim 1, in which the electrodes are selected from the group consisting of a ferrous metal and a ferroalloy.

* * * * *